United States Patent
Ide

(10) Patent No.: US 7,489,735 B2
(45) Date of Patent: Feb. 10, 2009

(54) APPARATUS AND METHOD FOR PROCESSING SIGNALS FROM RECORDING MEDIUM

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 455 days.

(21) Appl. No.: 11/046,850

(22) Filed: Feb. 1, 2005

(65) Prior Publication Data

US 2005/0190678 A1 Sep. 1, 2005

(30) Foreign Application Priority Data

Feb. 5, 2004 (JP) ............................. 2004-028741

(51) Int. Cl.
*H04L 7/02* (2006.01)
(52) U.S. Cl. ..................................................... 375/262
(58) Field of Classification Search ......... 375/259–262, 375/316, 340, 341; 396/44.41, 43, 44.11, 396/121, 100, 99; 714/699, 746, 786, 792, 714/794, 795; 704/200, 231, 236, 242
See application file for complete search history.

(56) References Cited

U.S. PATENT DOCUMENTS

| | | | | |
|---|---|---|---|---|
| 4,996,413 A | * | 2/1991 | McDaniel et al. | 250/208.1 |
| 5,835,509 A | * | 11/1998 | Sako et al. | 714/755 |
| 6,275,458 B1 | * | 8/2001 | Wong et al. | 369/47.19 |
| 6,597,642 B1 | * | 7/2003 | Ijima et al. | 369/44.11 |
| 7,043,682 B1 | * | 5/2006 | Ferguson | 714/796 |

FOREIGN PATENT DOCUMENTS

| JP | 11-126438 | 5/1999 |
|---|---|---|
| JP | 2002-042427 | 2/2002 |

\* cited by examiner

*Primary Examiner*—Mohammad H Ghayour
*Assistant Examiner*—Vineeta S Panwalkar
(74) *Attorney, Agent, or Firm*—Oblon, Spivak, McClelland, Maier & Neustadt, P.C.

(57) ABSTRACT

An apparatus for processing signals from a recording medium includes a plurality of detecting units for detecting signals recorded on the recording medium; a signal generating unit for generating a plurality of combined signals by combining the detected signals from the plurality of detecting units; and a maximum-likelihood decoding unit for decoding the plurality of combined signals by maximum-likelihood decoding, the plurality of combined signals being supplied from the signal generating unit.

2 Claims, 4 Drawing Sheets

-- BACKGROUND ART --

APPARATUS AND METHOD FOR PROCESSING SIGNALS FROM RECORDING MEDIUM

BACKGROUND OF THE INVENTION

1. Field of the Invention

The present invention relates to apparatuses and methods for reproducing original data from signals detected from recording media, signals supplied from transmitting media, and the like, and in particular, relates to an apparatus and a method for decoding detected signals by maximum-likelihood decoding.

2. Description of the Related Art

In general, apparatuses used for recording and reproducing data to/from a variety of recording media include, for example, detecting units detecting signals recorded on these recording media and decoding units decoding the detected signals from the detecting units to reproduce original binary data.

In recording and reproducing data to/from recording media, in view of increasing recording density, highly-reliable decoding units are disclosed in, for example, Japanese Patent No. 3016366 and U.S. Patent Application Publication No. 2003/0026028. These decoding units decode detected signals to reproduce binary data by a decoding method called the partial response maximum likelihood (PRML) method.

The PRML method includes a technique called the partial response technique for reproducing data strings though a channel having a predetermined impulse response and a technique called the maximum-likelihood decoding technique for selecting data strings presumed to be original data strings out of all possible data strings to decode the selected data strings.

An optical disk playback apparatus irradiates tracks on a disk surface with a laser beam and receives a reflected laser beam through a photodetector to detect data recorded on tracks.

FIG. 4 is a schematic view illustrating a photodetector and a laser spot on a track irradiated with a laser beam, in a known optical disk playback apparatus.

As shown in FIG. 4, a photodetector 100 includes a detecting area composed of four detecting segments A, B, C, and D that are arranged into two vertically and two horizontally. An optical system in an optical disk playback apparatus in use is adjusted so that the center of a laser spot 120 on a track 110 coincides with the center of the photodetector 100. Data recorded within the laser spot 120 is read out to reproduce signals.

The detecting area of the photodetector 100 is separated into four segments mainly because the laser spot needs to be focused on the disk surface. Data is reproduced using a sum signal (also referred to as a pull-in signal) of signals from the detecting segments A, B, C, and D. Thus, separating the detecting area into segments has no special significance for data reproduction.

Signals reproduced in this way are digitized to be input to a maximum-likelihood decoding unit. The maximum-likelihood decoding unit estimates original data based on the reproduced signals. In this way, the original data is reproduced.

In an optical disk playback apparatus having the structure as described above, noise generated in, for example, a photodetector, needs to be reduced so that a maximum-likelihood decoding unit can correctly estimate original data. A possible way to reduce the influence of noise generated in the photodetector is to reproduce the same data multiple times. However, the optical disk playback apparatus does not reproduce the same data multiple times. Thus, the same data is preferably reproduced through multiple channels at the same time.

A plurality of signals can be reproduced using the above-described known photodetector including the detecting area composed of the separated detecting segments. That is, reproducing a plurality of signals using such a detecting area corresponds to reproducing the same signal multiple times.

However, the intensity of each of the plurality of reproduced signals in each segment is disadvantageously reduced, and there is a problem due to the structure of a known maximum-likelihood decoding unit.

Although the above-described photodetector including the detecting area composed of the separated detecting segments can reproduce a plurality of signals at the same time, the level of a signal output from each detecting segment is low relative to noise, so that the advantage provided by the separated detecting segments is offset by the low signal level.

Since the known maximum-likelihood decoding unit is originally designed so as to use only a reproduced signal to estimate recorded original data, only a sum signal, or a difference signal, at best, from a plurality of reproduced signals can be decoded by maximum-likelihood decoding even when there are a plurality of detecting segments.

Thus, it is required that a plurality of signals be generated without decreasing the signal intensity and that a maximum-likelihood decoding unit estimate original data using multiple inputs.

SUMMARY OF THE INVENTION

Accordingly, it is an object of the present invention to provide an apparatus and a method for decoding outputs from a plurality of detecting segments in a photodetector by effective maximum-likelihood decoding to correctly reproduce signals.

To achieve the object, an apparatus for processing signals from a recording medium according to the present invention includes a plurality of detecting units for detecting signals recorded on the recording medium; a signal generating unit for generating a plurality of combined signals by combining the detected signals from the plurality of detecting units; and a maximum-likelihood decoding unit for decoding the plurality of combined signals by maximum-likelihood decoding, the plurality of combined signals being supplied from the signal generating unit.

To achieve the object, a method for processing signals from a recording medium according to the present invention includes a detecting step of detecting signals recorded on the recording medium using a plurality of detecting units; a signal-generating step of generating a plurality of combined signals by combining the detected signals from the plurality of detecting units; a maximum-likelihood decoding step of decoding the plurality of combined signals by maximum-likelihood decoding, the plurality of combined signals being supplied from the signal-generating step.

According to the apparatus and the method for processing signals from a recording medium of the present invention, the signals detected by the plurality of detecting units are combined to generate the plurality of combined signals. Then, the plurality of combined signals are decoded by maximum-likelihood decoding. Even when outputs from the plurality of separated detecting segments in the photodetector are used, the plurality of combined signals are less likely to be subjected to the influence of noise. Thus, effective maximum-likelihood decoding can be achieved to correctly reproduce original data.

DESCRIPTION OF THE PREFERRED EMBODIMENTS

An apparatus for reproducing data recorded on a recording medium according to an embodiment of the present invention includes a photodetector having a detecting area separated into detecting segments. The detecting segments are arranged in a plurality of arrays, each array being parallel to the traveling direction of a laser spot on a recording medium and detect signals from a recording medium.

The apparatus combines the signals detected by the respective detecting segments to generate a plurality of combined signals and decodes these combined signals by maximum-likelihood decoding.

A first combined signal is a sum signal derived from two reproduced signals from the detecting segments, and a second combined signal is a difference signal derived from two other reproduced signals from the detecting segments.

Then, original data is estimated by maximum-likelihood decoding, using a metric obtained by adding a metric related to the first combined signal and a metric related to the second combined signal at a predetermined ratio.

As described above, a plurality of signals are used not independently but in combination. In this arrangement, even when two combined signals from the two respective arrays of detecting segments of a photodetector are used, the intensity of each combined signal is not necessarily reduced by half. The above-described method for estimating original data based on a plurality of reproduced signals corresponds to the maximum-likelihood decoding methods disclosed by the applicant of the present invention in, for example, U.S. Patent Application Publication No. 2004/0064780 and Japanese Unexamined Patent Application Publication No. 2004-39139, the disclosures of which are hereby incorporated by reference.

According to the above-described method for estimating original data, estimation of original data by maximum-likelihood decoding is less likely to be subjected to the influence of noise and is correctly carried out using reproduced signals from a plurality of detecting segments in a photodetector.

For example, an apparatus for reproducing data recorded on a recording medium includes a photodetector having a detecting area composed of four separated detecting segments and generates a pull-in signal Sa+Sb+Sc+Sd and a tangential push-pull signal Sa+Sb−Sc−Sd based on reproduced signals from the detecting segments. This apparatus further includes a maximum-likelihood decoding unit decoding two input signals.

Since a known apparatus uses only a pull-in signal, noise in the detecting segments A and B correlates with noise in the detecting segments C and D when the apparatus calculates a metric in maximum-likelihood decoding.

In contrast, the method for estimating original data according to the present invention uses two combined signals in maximum-likelihood decoding to reduce this correlation, thereby effectively estimating original data.

Figure 1:
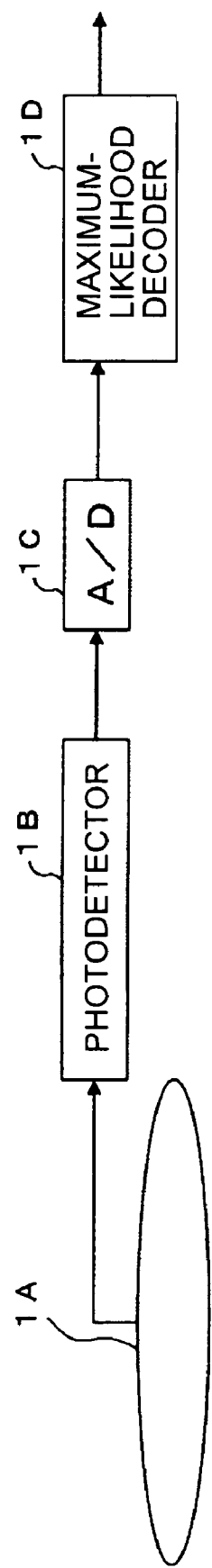
FIG. 1 is a block diagram illustrating the outline structure of an apparatus for processing signals from a recording medium according to an embodiment of the present invention.

FIG. 1 is a block diagram illustrating the outline structure of an apparatus for processing signals from a recording medium according to an embodiment of the present invention. This apparatus includes a recording medium 1A on which data is recorded, a photodetector 1B detecting signals of the data recorded on the recording medium 1A, an analog-to-digital (A/D) converter 1C sampling and digitizing the detected signals from the photodetector 1B, and a maximum-likelihood decoding unit 1D estimating original data based on the digitized combined signals from the A/D converter 1C.

Figure 2:
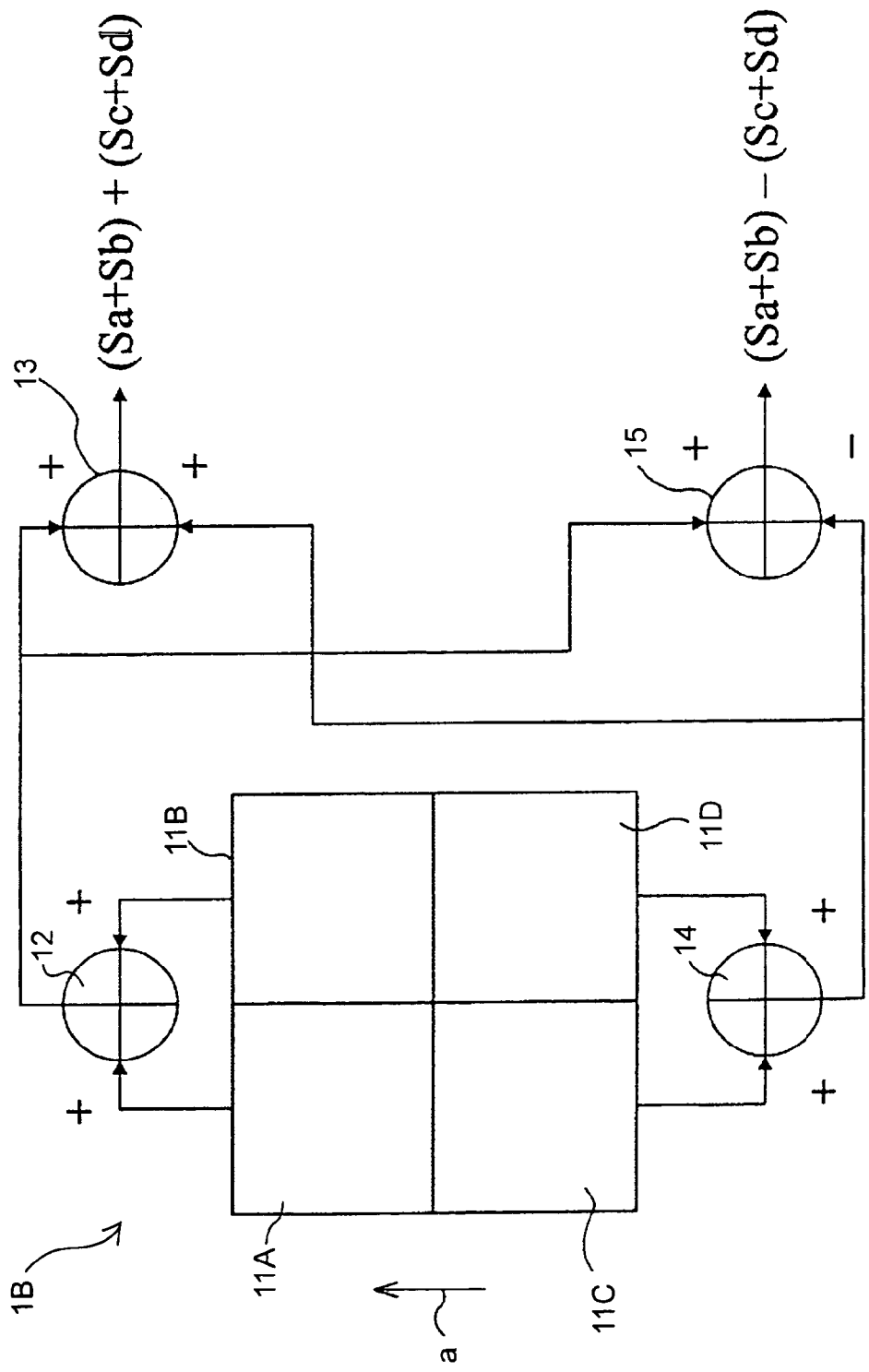
FIG. 2 is a circuit diagram of a photodetector in the apparatus shown in FIG. 1.

FIG. 2 is a circuit diagram of the photodetector 1B in the apparatus according to the present invention. The photodetector 1B is generally used in an optical disk playback apparatus. The photodetector 1B includes a detecting area composed of four separated detecting segments 11A, 11B, 11C, and 11D that are arranged into two vertically and two horizontally and that output individual detected signals.

In FIG. 2, the traveling direction of a laser spot on the recording medium 1A is vertical and is indicated by an arrow a. An array of the separated detecting segments 11A and 11C is disposed on a line. Another array of the separated detecting segments 11B and 11D is disposed on another line. These lines are parallel to the traveling direction of the laser spot on the recording medium 1A.

The separated detecting segments 11A, 11B, 11C, and 11D output reproduced signals Sa, Sb, Sc, and Sd, respectively.

A signal generating unit consists of operational amplifying circuits 12, 13, 14, and 15. Then, the operational amplifying circuits 12 and 13 generate a pull-in signal Sa+Sb+Sc+Sd, and the operational amplifying circuits 14 and 15 generate a tangential push-pull signal Sa+Sb−Sc−Sd, using the reproduced signals Sa, Sb, Sc, and Sd.

Figure 3:
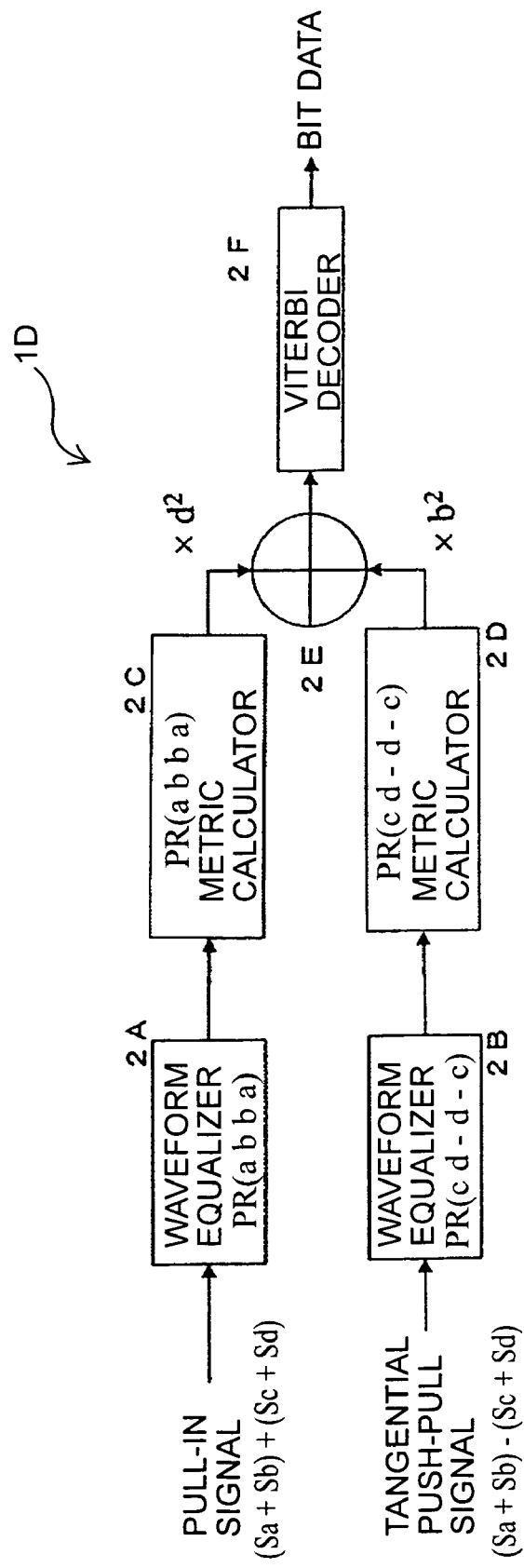
FIG. 3 is a block diagram illustrating the structure of a maximum-likelihood decoding unit in the apparatus shown in FIG. 1.
Figure 4:
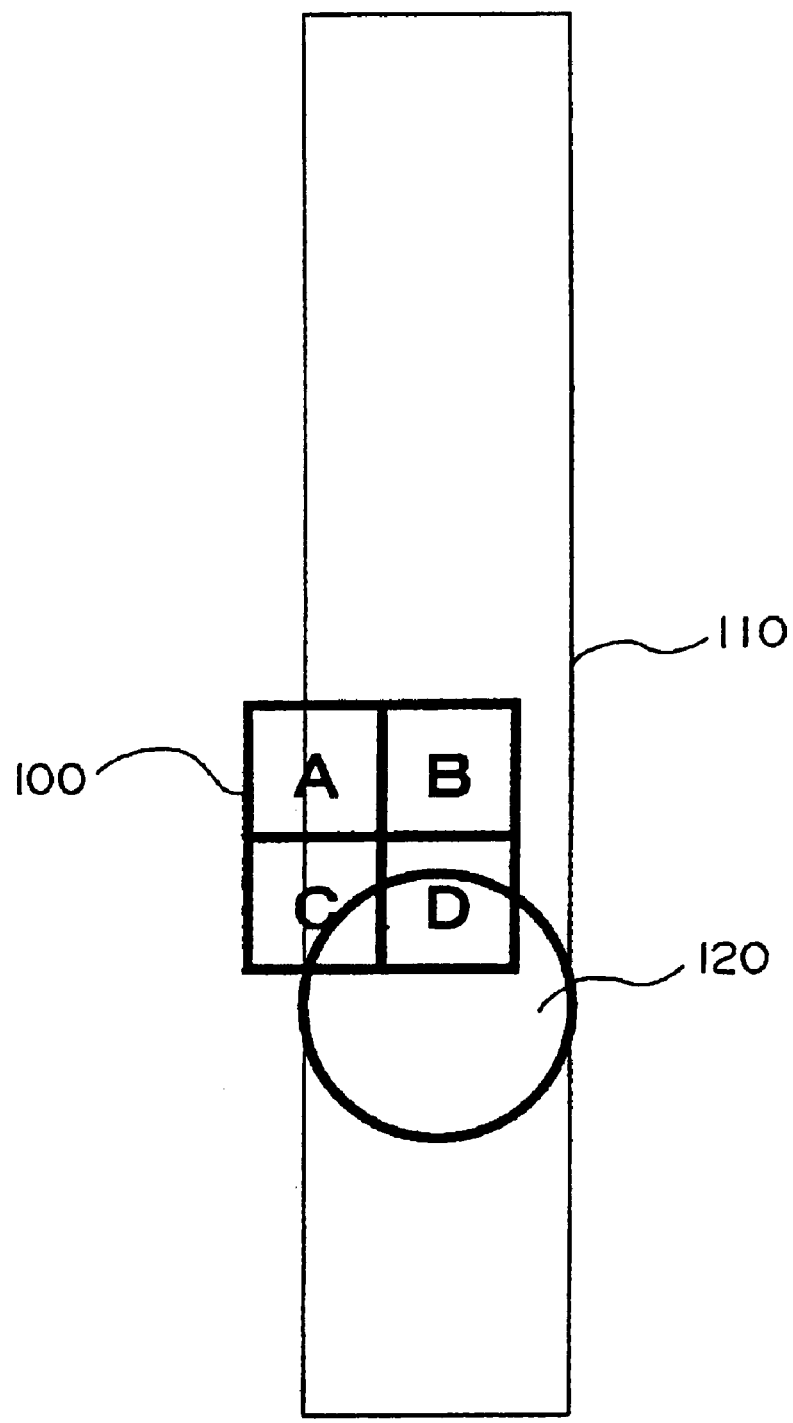
FIG. 4 is a schematic view illustrating a photodetector and a laser spot on a track irradiated with a laser beam, in a known optical disk playback apparatus.

FIG. 3 is a block diagram illustrating the structure of the maximum-likelihood decoding unit 1D according to the embodiment. The maximum-likelihood decoding unit 1D includes a first waveform equalizer 2A, a second waveform equalizer 2B, a first metric calculator 2C, a second metric calculator 2D, an adder 2E, and a Viterbi decoder 2F to simultaneously estimate original data based on two individual combined signals.

The first waveform equalizer 2A equalizes the pull-in signal Sa+Sb+Sc+Sd to a predetermined target partial response PR(a b b a). Since the pull-in signal Sa+Sb+Sc+Sd can be generally equalized to a symmetric waveform with respect to time, the target partial response PR is set so that it is symmetric with respect to time. The first metric calculator 2C calculates a metric between the equalized signal from the first waveform equalizer 2A and all possible signals generated from the partial response PR(a b b a).

The second waveform equalizer 2B equalizes the tangential push-pull signal Sa+Sb−Sc−Sd to a predetermined target partial response PR(c d −d −c). Since the tangential push-pull signal Sa+Sb−Sc−Sd can be generally equalized to an antisymmetric waveform with respect to time, the target partial response PR is set so that it is antisymmetric with respect to time. The second metric calculator 2D calculates a metric between the equalized signal from the second waveform equalizer 2B and all possible signals generated from the partial response PR(c d −d −c).

The adder 2E adds the metric output from the first metric calculator 2C and the metric output from the second metric calculator 2D at a predetermined ratio and inputs the result to the Viterbi decoder 2F.

The Viterbi decoder 2F estimates original data based on the input metric data.

As described above, two respective metrics are derived from the pull-in signal and the tangential push-pull signal generated from the four separated detecting segments of the detecting area in the photodetector. The two derived metrics are added to be used for correctly estimating original data by maximum-likelihood decoding.

The apparatus for processing signals from a recording medium according to the present invention includes a photodetector having a detecting area composed of four separated detecting segments and a maximum-likelihood decoding unit. Thus, the apparatus can effectively reproduce signals on an optical disk, as described above.

What is claimed is:

1. An apparatus configured to process signals from a recording medium, the apparatus comprising:
   a plurality of detecting units configured to detect signals recorded on the recording medium;
   a signal generating unit configured to generate a plurality of combined signals including a sum signal and a difference signal based on detected signals from the plurality of detecting units and supply the combined signals to a maximum-likelihood decoding unit; and
   a maximum-likelihood decoding unit configured to decode the plurality of combined signals being supplied from said signal generating unit by maximum-likelihood decoding including estimating original data based on a metric obtained by adding a metric related to the sum signal and a metric related to the difference signal at a predetermined ratio.

2. A method for processing signals from a recording medium, the method comprising:
   detecting signals recorded on the recording medium using a plurality of detecting units;
   generating a plurality of combined signals including a sum signal and a difference signal based on detected signals by combining the detected signals from the plurality of detecting units and supplying the combined signals to a maximum-likelihood decoding unit;
   decoding the plurality of combined signals by maximum-likelihood decoding, where the original data is estimated based on a metric obtained by adding a metric related to the sum signal and a metric related to the difference signal at a predetermined ratio, the plurality of combined signals being supplied from said generating of combined signals.

* * * * *